United States Patent
Weinstein et al.

(10) Patent No.: US 6,214,390 B1
(45) Date of Patent: *Apr. 10, 2001

(54) ASSEMBLAGE OF NUTRIENT BEVERAGES AND REGIMEN FOR ENHANCING CONVENIENCE, INSTRUCTION, AND COMPLIANCE WITH EXERCISE SUPPLEMENTATION

(76) Inventors: Robert E. Weinstein, 177 Commonwealth Ave., Boston, MA (US) 02115; Allan M. Weinstein, 9205 Pegasus Ct., Potomac, MD (US) 20854; David Schmier, 1822 Pandora Ave., #3, Los Angeles, CA (US) 90025

( * ) Notice: Subject to any disclaimer, the term of this patent is extended or adjusted under 35 U.S.C. 154(b) by 0 days.

This patent is subject to a terminal disclaimer.

(21) Appl. No.: 09/429,872

(22) Filed: Oct. 29, 1999

Related U.S. Application Data

(63) Continuation-in-part of application No. 08/997,406, filed on Dec. 23, 1997, now Pat. No. 6,013,290, which is a continuation-in-part of application No. 08/971,302, filed on Nov. 17, 1997, now abandoned.

(51) Int. Cl.[7] .................................................... A23L 1/304
(52) U.S. Cl. .................................. 426/74; 426/2; 426/74; 426/108; 426/120; 426/590; 426/656; 426/810
(58) Field of Search ................................ 426/2, 74, 108, 426/120, 656, 810, 590; 424/439

(56) References Cited

U.S. PATENT DOCUMENTS

| | | |
|---|---|---|
| 5,236,712 | 8/1993 | Fregly et al. . |
| 5,403,921 | 4/1995 | Montner et al. . |
| 5,587,190 | 12/1996 | Guezennec et al. . |
| 5,780,094 | 7/1998 | King . |
| 5,817,364 | 10/1998 | Olin . |
| 6,013,290 | * 1/2000 | Weinstein et al. ............... 426/74 |

FOREIGN PATENT DOCUMENTS

WO 88/01248   2/1988 (WO) .

OTHER PUBLICATIONS

J.L. Ivy, Glycogen Resynthesis After Exercise: Effect of Carbohydrate Intake, 19 Intl. J. Sports Medicine 142–5 (1998).

B.B. Yaspelkis III and J.L. Ivy, The Effect of a Carbohydrate–9 Intl. J. Sports Nutrition 241–50 (Sep. 1999).

K.M. Zawadzki et al., Carbohydrate–Protein Complex Increases the Rate of Muscle Glycogen Storage After Exercise, 72(5) J. Applied Physiology 1854–59 (May 1992).

B.J. Lyle et al., Hydration and Fluid Replacement, in Sports Nutrition for the 90s, 175 (J.R. Benning et al. eds, 1991).

J.E. Greenleaf, Problem: Thirst, Drinking Behavior, and Involuntary Dehydration, 24 Med. Sci. Sports Exercise 645 (1991).

J.L. Ivy et al., Muscle Glycogen Synthesis After Exercise: Effect of Time of Carbohydrate Ingestion, 64 J. Applied Physiology 1480 (1988).

* cited by examiner

Primary Examiner—Helen Pratt
(74) Attorney, Agent, or Firm—Morse, Altman & Martin

(57) ABSTRACT

A device and method for use in conjunction with exercise of about one hour or less which enhances convenience, and encourages compliance with a regimen of exercise beverages to accomplish preexercise hydration and postexercise hydration and muscle glycogen replenishment, and which includes a preexercise beverage formulation and a postexercise beverage formulation combined in a unified package with indicia and instructions. The preexercise beverage has a carbohydrate concentration of not more than about 9%, and the postexercise beverage has a carbohydrate concentration of at least about 13%.

6 Claims, 1 Drawing Sheet

ASSEMBLAGE OF NUTRIENT BEVERAGES AND REGIMEN FOR ENHANCING CONVENIENCE, INSTRUCTION, AND COMPLIANCE WITH EXERCISE SUPPLEMENTATION

RELATED APPLICATIONS

The present application is a continuation-in-part application of application Ser. No. 08/997,406, dated Dec. 23, 1997 now U.S. Pat. No. 6,013,290 for ASSEMBLAGE OF NUTRIENT BEVERAGES AND REGIMEN FOR ENHANCING CONVENIENCE, INSTRUCTION, AND COMPLIANCE WITH EXERCISE SUPPLEMENTATION in the names of Robert E. Weinstein, Allan M. Weinstein, and David Schmier, which is a continuation-in-part of application Ser. No. 08/971,302, dated Nov. 17, 1997 for ASSEMBLAGE OF NUTRIENT BEVERAGES AND REGIMEN FOR USE IN CONJUNCTION WITH EXERCISE in the names of Robert E. Weinstein, Allan M. Weinstein, and David Schmier.

BACKGROUND OF THE INVENTION

1. Field of the Invention

The present invention relates to physical fitness, more particularly, to nutrient beverage formulations for consumption before and after a physical exercise session.

2. The Prior Art

It is well known that the availability of water is critical to the maintenance of plasma volume and regulation of body temperature during exercise, and that carbohydrate availability is necessary for the maintenance of muscle glycogen, the major source of energy for working skeletal muscle. The failure to attended to these requirements of exercise may result in negative effects on performance or detrimental effects on health.

While it is known that the fluids and nutrients that are lost during exercise must be replenished, it is generally assumed that instinctive responses, such as hunger and thirst, are sufficient to prompt an individual to ingest the appropriate fluids and nutrients at appropriate times and in appropriate amount to fulfill the needs of exercise. However, this is not the case. Surveys have disclosed that knowledge of fluid requirements is lacking, even among serious athletes. Moreover, it has been shown that thirst is unreliable for determining how much fluids to drink, or when to drink them. Blunted thirst sensation is known to occur with exercise, and thirst can be quenched before the body completely rehydrates. Fluid losses can accumulate over several days of exercise to produce a state of hypohydration.

About one liter of water per hour is typically lost in sweat during average exercise, and it is advisable for individuals to deliberately replace such fluids. This is preferably accomplished by both anticipating fluid loss prior to exercise and replacing fluids lost after exercise.

Glucose derived from storage in muscle as glycogen is established to be the major fuel for most types of exercise, and it is advantageous to promote muscle glycogen storage. Carbohydrate replacement soon after exercise has been found to facilitate recovery of muscle glycogen after exercise, and delay of carbohydrate consumption for even two hours after exercise can reduce the rate of recovery by 50%.

Application Ser. No. 08/997,406, now U.S. Pat. No. 6,013,290 incorporated herein by reference, points out that single beverage formulations alone fail to accomplish pre-exercise hydration, rehydration after exercise, and postexercise replenishment of muscle glycogen, and discloses the use of a packaged regimen of preformulated beverages to teach users, enhance convenience, and encourage compliance with these objectives. Application Ser. No. 08/997,406 discloses the use of dilute carbohydrate beverages for before exercise and beverages with carbohydrate concentration of greater than about 20% for after exercise. Not disclosed, however, are postexercise formulations containing lesser carbohydrate concentrations which are now known to be sufficient to accomplish muscle glycogen replacement.

The data disclosed in J. L. Ivy, *Glycogen Resynthesis after Exercise: Effect of Carbohydrate Intake*, 19 Intl. J. Sports Medicine 142–5 (1998), published subsequent to the Dec. 23, 1997 filing of application Ser. No. 08/997,406 indicates that carbohydrate supplement in excess of 1.0 gram/kilogram (g/Kg) of body weight consumed immediately after exercise maximizes glycogen resynthesis, and the data of B. B. Yaspelkis and J. L. Ivy, *The Effect of a Carbohydrate-Arginine Supplement on Postexercise Carbohydrate Metabolism*, 9 (3) Intl. J. Sports Nutrition 241–50 (September 1999) discloses that the addition of arginine in the amount of 0.08 g/Kg of body weight to carbohydrate in the amount of 1.0 g/Kg of body weight following exercise may further increase the availability of glucose for glycogen storage recovery. Earlier findings of K. M. Zawadzki et al., *Carbohydrate-Protein Complex Increases the Rate of Muscle Glycogen Storage after Exercise*, 72 (5) J. Applied Physiology 1854–9 (May 1992) also suggest enhancement of postexercise muscle glycogen with the addition of protein to carbohydrate ingested following exercise.

SUMMARY OF THE INVENTION

An object of the present invention is to provide a person with a combination of nutrient beverage formulations and a regimen for their use prior to and after an exercise session lasting approximately one hour or less.

Another object is to provide a person with a combination of nutrient beverage formulations formulated to enhance performance during an exercise session and to reduce the detrimental physiological effects of the exercise after the session.

Yet another object is to provide a person with a combination of nutrient beverage formulations preformulated to work together in an optimal fashion by application of scientifically-derived data.

A further object is to provide a person with a combination of nutrient beverage formulations that is convenient and simple to use.

The present invention includes a regimen that comprises two different formulations containing fluids and nutrients and a program for use of the formulations before and after an exercise session. Each formulation is designed for the needs of a different phase of exercise and for compatibility with each other, something that is outside of the expertise of an ordinary user.

The present invention teaches a method and device for instructing a user, enhancing convenience, and encouraging compliance with exercise supplementation, which employs a hydrating preexercise beverage, a hydrating and muscle glycogen replenishing postexercise beverage, and indicia and instructions for coordinating the use of such a regimen. The preexercise beverage has a carbohydrate concentration of not more than about 9%, and the postexercise beverage has a carbohydrate concentration of at least about 13%.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

Figure 1:
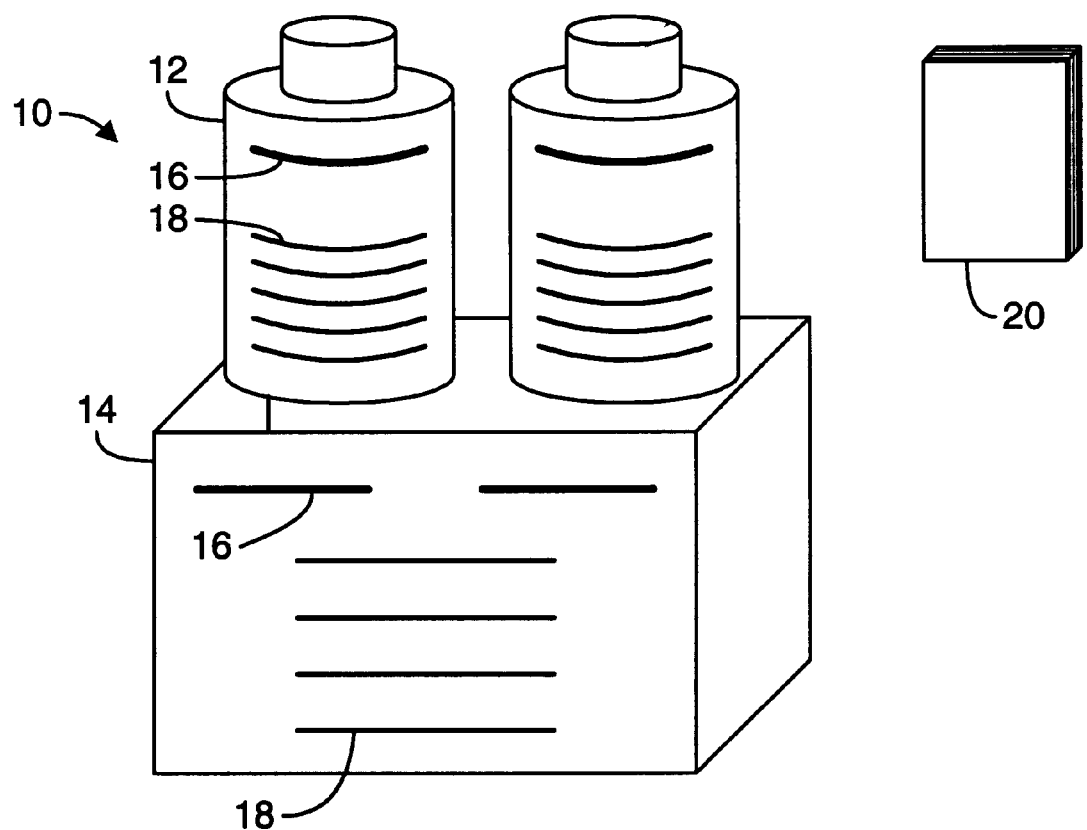
FIG. 1 shows an example embodiment of the present invention.

A detailed description of the packaging of the present invention is described in application Ser. No. 08/997,406. In summary, the preferred embodiment 10 provides formulations in discrete containers of fully-constituted liquid so that they may be drunk directly. The formulations are combined together in a unified package 14 with indicia 16 for identification of the different formulations and instructions 18 for their use.

Application Ser. No. 08/997,406 describes preexercise formulations having a carbohydrate concentration of up to about 9% and postexercise formulations having a carbohydrate concentration of at least about 20%. The present invention additionally contemplates the formulation of postexercise beverages in accord with data published after the filing of application Ser. No. 08/997,406.

Principal objectives of postexercise beverages for exercise are rehydration and restoration of muscle glycogen. It is now established that replenishment of carbohydrate in the order of 1.0 g/Kg of body weight directly following exercise is adequate to maximize muscle glycogen resynthesis. It is also found that the addition of protein, and particularly the amino acid arginine, to postexercise carbohydrate may increase the availability of glucose for muscle glycogen storage during recovery.

For an average sized 70 Kg individual, replenishment of carbohydrate in the amount of 1.0 g/Kg of body weight following exercise would require a beverage containing 70 grams of carbohydrate. For example, a 19.4% carbohydrate concentration would be required for a 360 milliliter (ml) beverage and a 13% concentration would be required for a 540 ml beverage. A small 50 Kg person requiring 50 grams of carbohydrate would require a 16.7% concentration of carbohydrate for a 300 ml beverage and a 12.8% concentration for a 390 ml beverage. A large, 90 Kg person requiring 90 grams of carbohydrate, would require a 21.4% concentration of carbohydrate for a 420 ml beverage and a 15% concentration for a 600 ml beverage. Considering the amount of beverage which may be comfortably ingested by different sized users, and individual variations thereof, the preferred range of carbohydrate concentration to approximate glycogen replenishment according to the 1 g/Kg parameter would be from about 13% to about 20%.

The following are examples of beverage regimens which might be formulated to accomplish preexercise and postexercise hydration and postexercise muscle glycogen replenishment. These examples are meant to be illustrative and are not intended to be exhaustive.

EXAMPLE I

Preexercise:

15 grams of carbohydrate and 360 ml of water (4.2% carbohydrate solution) for consumption approximately 10–20 minutes prior to exercise.

Postexercise:

60 grams of carbohydrate and 420 ml of water (14.3% carbohydrate solution) for consumption shortly following exercise.

This regimen is particularly suitable for an individual weighing about 60 Kg (132 lb.). The principal objective of the preexercise beverage is prehydration by providing a small "reservoir" of fluid in the gastrointestinal lumen which will be absorbed during the early phases of exercise. Evidence for enhancement of performance by preloading with carbohydrate is lacking for such short periods of exercise and, moreover preloading with concentrated carbohydrate solutions are known to have the potential for such adverse effects during exercise as rebound hypoglycemia, delay in gastric emptying, gastrointestinal distress and osmotic diarrhea. Water or dilute solutions such as the 4.0% carbohydrate solution of this example are preferred. In contrast, the 14.0% carbohydrate solution formulation which supplies 1 gram of carbohydrate per kilogram of body weight for glycogen restoration is advantageous following exercise.

EXAMPLE II

Preexercise:

20 grams of carbohydrate and 450 ml of flavored water (4.4% carbohydrate solution) for consumption approximately 10–20 minutes prior to exercise.

Postexercise:

75 grams of carbohydrate and 550 ml of flavored water (13.6% carbohydrate solution) for consumption directly following exercise.

This regimen might be particularly suitable for an average sized man weighing about 75 Kg (165 lb.) and consists of a 4.4% carbohydrate solution preexercise formulation and a 13.6% carbohydrate solution postexercise formulation, which would supply 1 gram of carbohydrate per kilgram of body weight. The combined preexercise and postexercise volume of fluid totals 1.0 liter, typical of the losses encountered in one hour of average exercise.

Flavoring might be added to increase palatability and encourage the use of the beverages. Cooling of the beverages is known to increase both palatability and gastric emptying, and optionally, such means as are known in the art to facilitate provision of cool beverages for a user, such as insulated packaging, are considered advantageous.

EXAMPLE III

Preexercise:

30 grams of carbohydrate and 500 ml of water (6.0% carbohydrate solution) for consumption approximately 10–20 minutes prior to exercise.

Postexercise:

90 grams of carbohydrate, 7.2 grams of arginine hydrochloride, and 600 ml of water (15.0% carbohydrate solution) for consumption shortly following exercise.

This regimen might be considered particularly suitable for an individual weighing about 90 Kg (198 lb.). Combined preexercise and postexercise fluid replacement totals 1.1 liters. The 6.0% carbohydrate preexercise formulation is dilute relative to the 15.0% carbohydrate postexercise formulation, which would supply a user with 1 gram of carbohydrate per kilgram of body weight. Arginine hydrochloride in a concentration of 0.08 g/Kg of body weight is added to reduce the rate of postexercise carbohydrate consumption and increase the availability of glucose for muscle glycogen storage during recovery. Conversely, it may be desired to add yet more carbohydrate following exercise since the concerns of hypoglycemia and gastrointestinal overloading during exercise do not apply.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An exercise beverage kit comprising:
   (a) a first beverage having a volume of water of from about 300 milliliters to about 600 milliliters and a concentration of carbohydrate of about 9% or less;
   (b) a second beverage having a volume of water of from about 300 milliliters to about 600 milliliters and a concentration of carbohydrate of greater than about 13%;
   (c) indicia to distinguish said first beverage and said second beverage;
   (d) instructions teaching the use of said first beverage and said second beverage as a regimen in association with exercise having a duration of about one hour or less, such that said first beverage is instructed for ingestion prior to said exercise and said second beverage is instructed for ingestion directly following said exercise; and
   (e) packaging unifying said first beverage, said second beverage, indicia, and instructions.

2. The kit of claim 1 wherein said second beverage additionally contains arginine.

3. A method for preparing an exercise hydration and muscle glycogen replenishment kit comprising the steps of:
   (a) formulating a first beverage to have a volume of water of from about 300 milliliters to about 600 milliliters, and a concentration of carbohydrate of less than about 9%;
   (b) formulating a second beverage to have a volume of water of from about 300 milliliters to about 600 milliliters, and a concentration of carbohydrate of greater than about 13%;
   (c) devising indicia to distinguish said first beverage and said second beverage;
   (d) devising instructions to teach the use of said first beverage and said second beverage as a regimen in association with exercise of duration of about one hour or less, such that said first beverage is instructed for ingestion prior to said exercise, and said second beverage is instructed for ingestion directly following said exercise; and
   (e) providing said first beverage, second beverage, indicia, and instructions in a unified package for a user.

4. The method of claim 3 wherein said second beverage additionally contains arginine.

5. A method for exercise hydration and muscle glycogen replenishment method comprising the steps of:
   (a) obtaining an exercise beverage kit comprising a first beverage having a volume of water of from about 300 milliliters to about 600 milliliters and a concentration of carbohydrate of less than about 9%, a second beverage having a volume of water of from about 300 milliliters to about 600 milliliters and a concentration of carbohydrate of greater than about 13%, indicia to distinguish said first beverage and said second beverage, instructions teaching the use of said first beverage and said second beverage as a regimen in association with exercise of about one hour or less, and packaging unifying said first beverage, said second beverage, indicia, and instructions;
   (b) using said indicia to distinguish said first beverage, said second beverage;
   (c) drinking said first exercise beverage prior to said exercise in accordance with said instructions; and
   (d) drinking said second exercise beverage directly following said exercise in accordance with said instructions.

6. The method of claim 5 wherein said second beverage additionally contains arginine.

* * * * *